United States Patent
Taillefer et al.

(10) Patent No.: US 10,096,993 B2
(45) Date of Patent: Oct. 9, 2018

(54) CONTROLLED SWITCHING DEVICES AND METHOD OF USING THE SAME

(71) Applicants: VIZIMAX INC., Longueuil, Quebec (CA); Eric Sleigh, Victoria (CA)

(72) Inventors: Pierre Taillefer, Boucherville (CA); Eric Sleigh, Victoria (CA)

(73) Assignees: VIZIMAX INC., Loungueuil (CA); Eric Sleigh, Victoria (CA)

( * ) Notice: Subject to any disclaimer, the term of this patent is extended or adjusted under 35 U.S.C. 154(b) by 10 days.

(21) Appl. No.: 15/102,807

(22) PCT Filed: Dec. 8, 2014

(86) PCT No.: PCT/IB2014/066710
§ 371 (c)(1),
(2) Date: Jun. 8, 2016

(87) PCT Pub. No.: WO2015/083145
PCT Pub. Date: Jun. 11, 2015

(65) Prior Publication Data
US 2017/0025849 A1 Jan. 26, 2017

Related U.S. Application Data

(60) Provisional application No. 61/913,351, filed on Dec. 8, 2013, provisional application No. 61/913,362, filed on Dec. 8, 2013.

(51) Int. Cl.
*H02H 9/00* (2006.01)
*H02H 3/32* (2006.01)

(52) U.S. Cl.
CPC .............. *H02H 9/002* (2013.01); *H02H 3/32* (2013.01)

(58) Field of Classification Search
CPC ............ H02H 9/002; H02H 3/32; H02H 3/08; H02H 3/087; H02H 3/006; H02H 7/06; H02H 7/12; H02H 7/18
USPC .......... 307/326, 327, 328; 361/84, 85, 86, 87
See application file for complete search history.

(56) References Cited

U.S. PATENT DOCUMENTS 8,310,106 B2 * 11/2012 Koshiduka ............ H02H 9/002
307/101

* cited by examiner

*Primary Examiner* — John Poos
(74) *Attorney, Agent, or Firm* — Robert Brouillette; Brouillette Legal Inc.

(57) ABSTRACT

It is disclosed a technique to reduce significantly the arc flash incident energy in commercial and industrial electrical installations connected to typical electric distribution networks, by limiting transformer inrush current and allowing more sensitive protection settings. It also disclosed a technique to increase the energy capacity of these installations. Inrush current reduction is achieved through the use of a Controlled Switching Device (CSD). It is disclosed a method for lowering an arc flash inside an electrical circuit comprising a breaker and being electrically fed with an electrical current, the method comprising the step of providing the electrical circuit with a CSD adapted to send an open or close command to the breaker in order to synchronize an open and close mechanical operation, preferably at an optimal electrical angle. It is also disclosed an electric circuit comprising a CSD for lowering an arc flash inside the circuit.

13 Claims, 10 Drawing Sheets

Figure 5 - 25kV - 5MVA - W/O CSD

Figure 6 - 25kV - 5MVA - WITH CSD

Figure 9 - 25kV - 8 MVA - W/O CSD

Figure 10 - 25kV - 8MVA - WITH CSD

CONTROLLED SWITCHING DEVICES AND METHOD OF USING THE SAME

CROSS-REFERENCE TO RELATED APPLICATIONS

The present patent application claims the benefits of priority of U.S. Patent Application No. 61/913,351 and No. 61/913,362 both entitled "CONTROLLED SWITCHING DEVICES AND METHOD OF USING THE SAME" and filed at the United-States Patent and Trademark Office on Dec. 8, 2013.

FIELD OF THE INVENTION

The present invention belongs to the field of electrical engineering. The invention relates in particular to a device and method for lowering the severity of an arc flash occurrence in commercial and industrial electrical systems by limiting inrush current which in turn allows the implementation of tighter and more sensitive overcurrent protection. More particularly, the present invention concerns Controlled Switching Devices (CSDs) and methods for using the same. In addition, this invention may allow for an increase of an installation's electrical capacity.

BACKGROUND OF THE INVENTION

In large industrial and commercial premises, transformer energization may cause large inrush current that can be 15 times the nominal current. This phenomenon requires safety margins placed on overcurrent protection device settings so as to allow the devices to clear these currents; this in turn makes it difficult to establish sensitive protection settings, leading to high incident energy levels from electrical faults often resulting in damaging arc flash events.

Arc flash is one of the major causes of personal injuries and fatalities in large industrial facilities. Required safety margins and the effects of inrush current also limit the size of the transformation connected to the distribution system.

Many patents describe invention of devices that can detect the occurrence of an arc flash. The arc flash can be detected with measurement of light, such as in U.S. Pat. No. 9,046,391, measurement of pressure inside the cabinet or by measuring the level of noise. While these approaches are appropriate to detect the presence of an arc flash, there is a need to eliminate the root cause (magnitude of current or the amount of time that current can be present) of an arc flash event. An arc flash event and its severity is due to some form of short circuit within equipment, when the short circuit is not cleared fast enough—typically due to an intentional delay in the protection system. This delay is set in the protection relay to take into account the current inrush during transformer energization and avoid unwanted tripping. The present invention proposes a novel approach to eliminate the inrush current and therefore allow more sensitive protection settings that can clear an electrical fault faster. This aids in limiting the severity of human injuries and damage to equipment.

When a power transformer is de-energized, a residual magnetic flux may remain in the core of the power transformer. It is generally well known that due to that residual magnetic flux, the uncontrolled energization of a transformer may cause inrush currents having several orders of magnitudes of the rated current value of the transformer. To avoid any unwanted tripping during this energization process, the protection setting must include some delay to let the inrush current taper off and disappear.

Over the years, techniques were developed to mitigate and/or reduce inrush current. A well-known technique to mitigate power transformer inrush current uses a circuit breaker (CB) equipped with pre-insertion resistors/closing resistors. Another current technique for mitigating inrush current uses smoothing inductors along with the CB. However, these two known techniques require the use of more complex CBs with additional components and have proved to add major costs for both installation and maintenance. Therefore, it is well known that these mechanical add-ons increase the frequency of maintenance operations and reduce overall reliability.

A paper entitled "Elimination of Transformer Inrush Currents by Controlled Switching—Part I and II" published in the *IEEE transactions on power delivery*, Vol. 16, No. 2 in April 2001, discloses a novel approach making use of controlled switching techniques. This paper describes a method for controlling the closing of a circuit breaker at a precise electrical angle calculated based on the magnitude and polarity of the residual magnetic flux of the transformer.

Another paper, entitled "Transformer controlled switching taking into account the core residual flux a real case study" and published in CIGRE 13-201 session 2002, discloses demonstrated field results of the implementation of above mentioned technique. The controlled switching using an independently-operated pole circuit breaker has proved to effectively eliminate the inrush current. This approach uses different electrical closing angles on each pole of the circuit breaker according to the calculated residual magnetic flux in the transformer core (delayed closing strategy). The residual magnetic flux of each transformer phase resulting from de-energization is calculated using the mathematical integral of the transformer voltage. When energizing the power transformer, the closing angle of the circuit breaker is adjusted in such a way that the prospective magnetic flux produced by the energization matches or equals the residual magnetic flux in that phase. The two other phases are closed n half cycles after the zero crossing voltage edge preceding the first phase to be closed.

Figure 1:
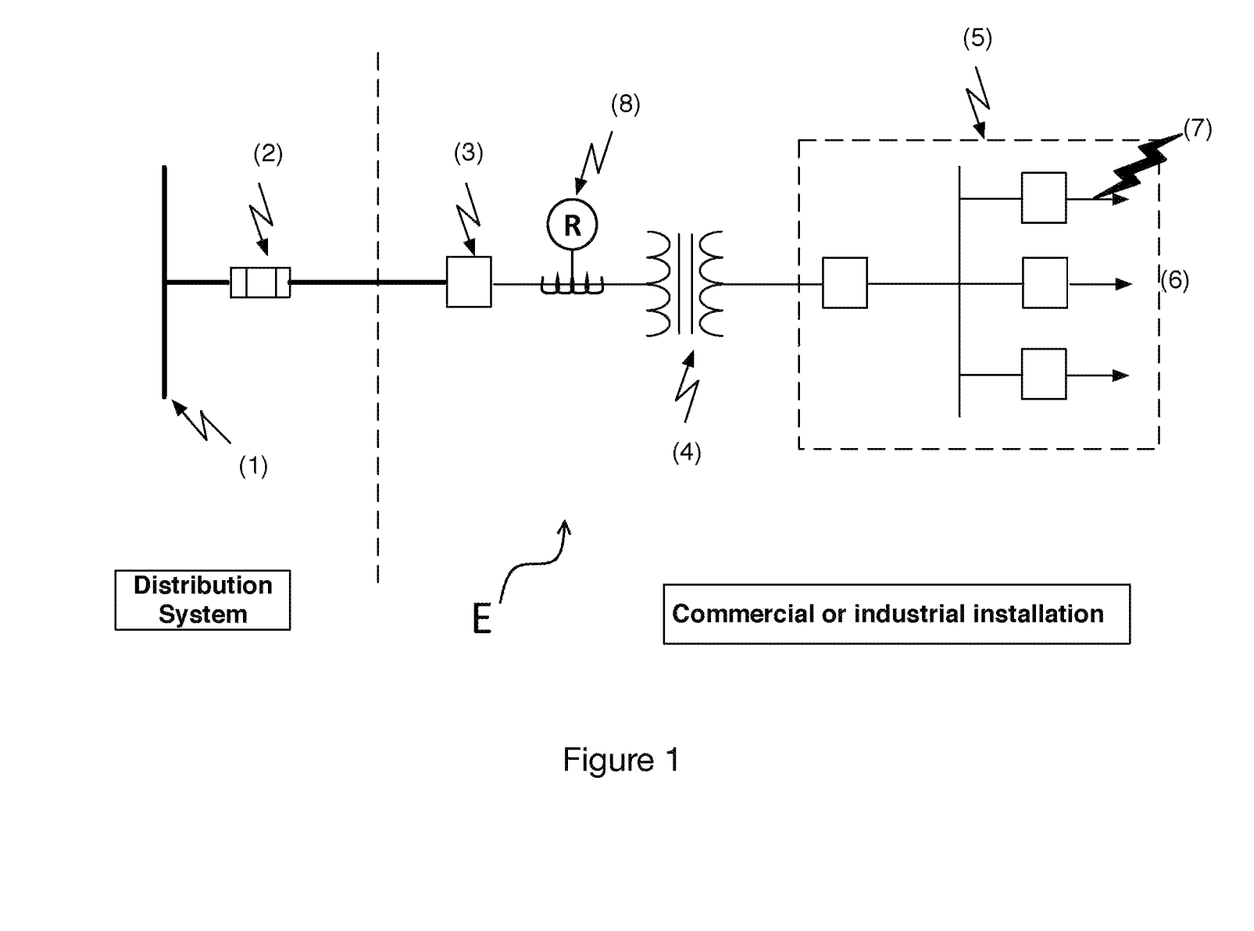
FIG. 1 shows the typical connection of a commercial or industrial installation to the distribution system (Prior Art).

CSD techniques have also been used for current inrush mitigation for capacitor banks switching, reactors and power lines. The same technique is proposed in this standard in order to eliminate inrush current in many standard commercial/industrial interconnections with the utility. FIG. 1 shows such an interconnection. The distribution system (1) feeds the commercial or industrial installation. A fuse (2), with a value imposed by the utility, often limits the size of transformation and is sized as small as possible to clear transformer inrush while still providing adequate short circuit protection. The circuit breaker (3) is the customer owned device that can isolate the installation for maintenance purposes or for safety reasons and acts to protect the customer owned equipment against damaging overcurrent. The main power transformer (4) reduces the voltage on the distribution network to a lower value to feed the loads of the facility (6) in the installation (5). Often times, even if the fault is detected, a severe arc flash (7) event will still occur because the clearing time of the protection device is not fast enough to mitigate the amount of energy available to the faulted location. The protection relay (8) detects overload, short-circuits, and other electrical faults. On such occurrence, it trips the circuit breaker (3).

Figure 2:
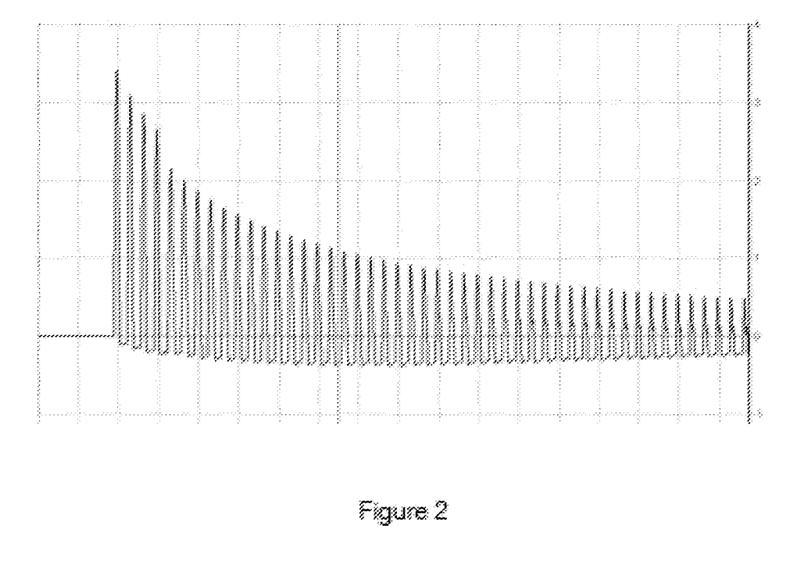
FIG. 2 shows an example of inrush current (Prior Art).

The inrush current, shown in FIG. 2, in a commercial or industrial installation is primarily caused by the uncontrolled energization of the main power transformer (4). The presence of residual flux in the transformer's magnetic core resulting from its previous de-energization is responsible for the high inrush current when the energization of the power transformer is uncontrolled, causing transformer saturation. At the present time, due to this inrush current, the setting of protective relays (8) must take into account the high level of inrush current, consequently these devices are less sensitive to faults in the downstream installation (5). Since the protection is less sensitive, detection of faults is less effective at minimizing and mitigating arc flash events. Furthermore, since the inrush current can rise up to 15 times the nominal current, the power capacity and size of the transformation at an installation is limited due to the detrimental transformer energization effects on the distribution system.

An arc flash happens when electric current flows through the air between conductors. It releases intense light, heat, sound, and blast of arc that are produced by vaporized components of enclosure material such as copper, steel, or aluminum. Injuries resulting from arc flash events in electric power systems are among the most traumatic and costly safety hazards.

Figure 4:
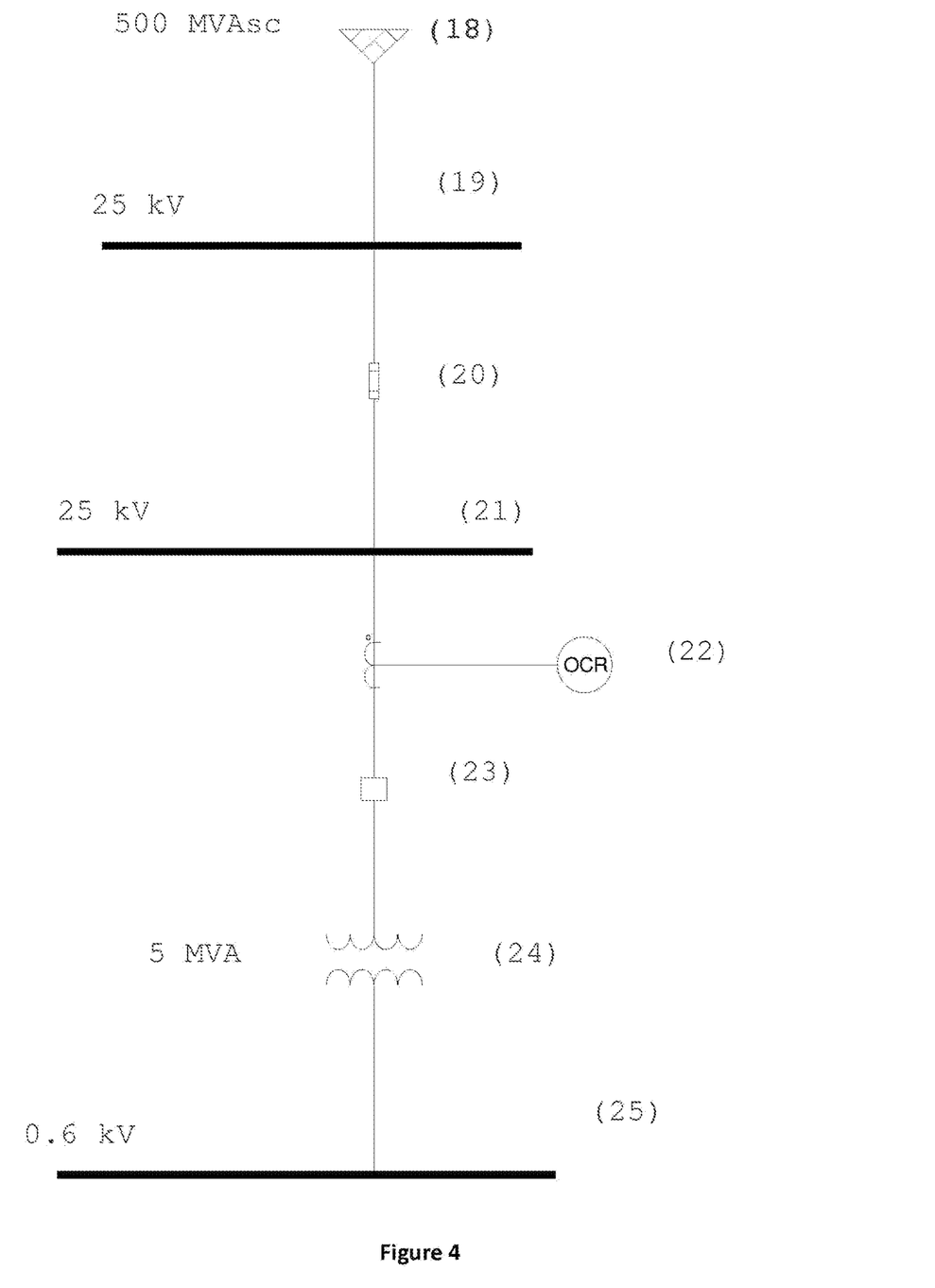
FIG. 4 shows the single line diagram used for simulation (Prior Art).

FIG. 4 shows a single line diagram used for protection coordination simulations. In this example, a utility system (18) feeds a utility bus (19). The customer bus (21) is connected to the utility bus through a fuse (20).

On the customer side, a transformer (24) changes the voltage level from 25000 V to 600 V. A circuit breaker (23) can be operated manually (opened) to isolate the customer load (25) or it can be tripped (opened) by the overcurrent relay (22).

Figure 5:
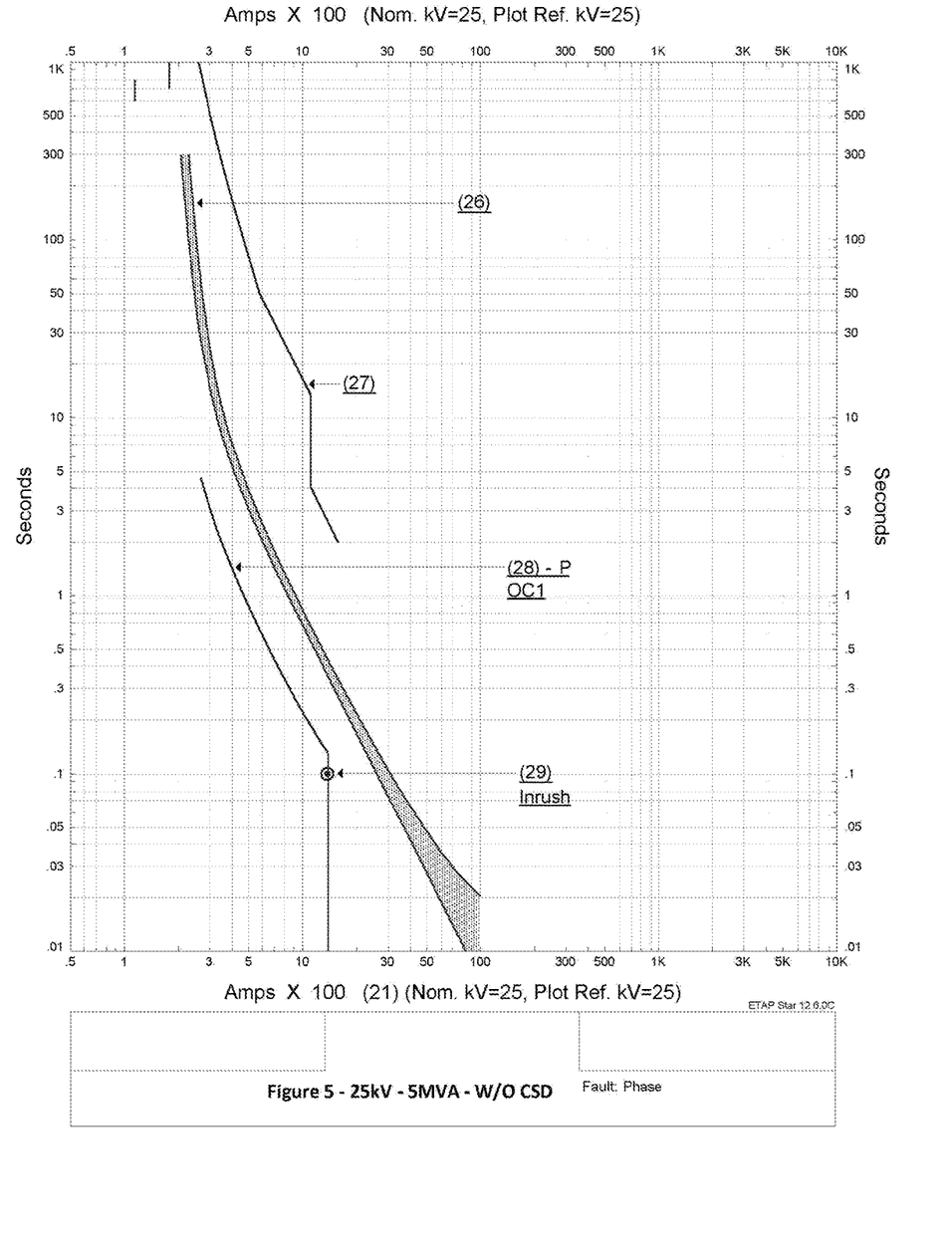
FIG. 5 shows the protective device coordination graph for a 5 MVA transformer with no CSD (Prior Art).

As illustrated in FIG. 5, time vs current coordination graph, the customer overcurrent protection relay (28) must be set so as to overcome the worst-case transformer inrush (29). On the same figure, the relay allows 180 A of continuous current flow. Since no CSD is used, the inrush current can be very high (up to 15 times the transformer full load amps). For this reason, the instantaneous portion of the overcurrent protection relay (28) is set at 1400 A.

Figure 7:
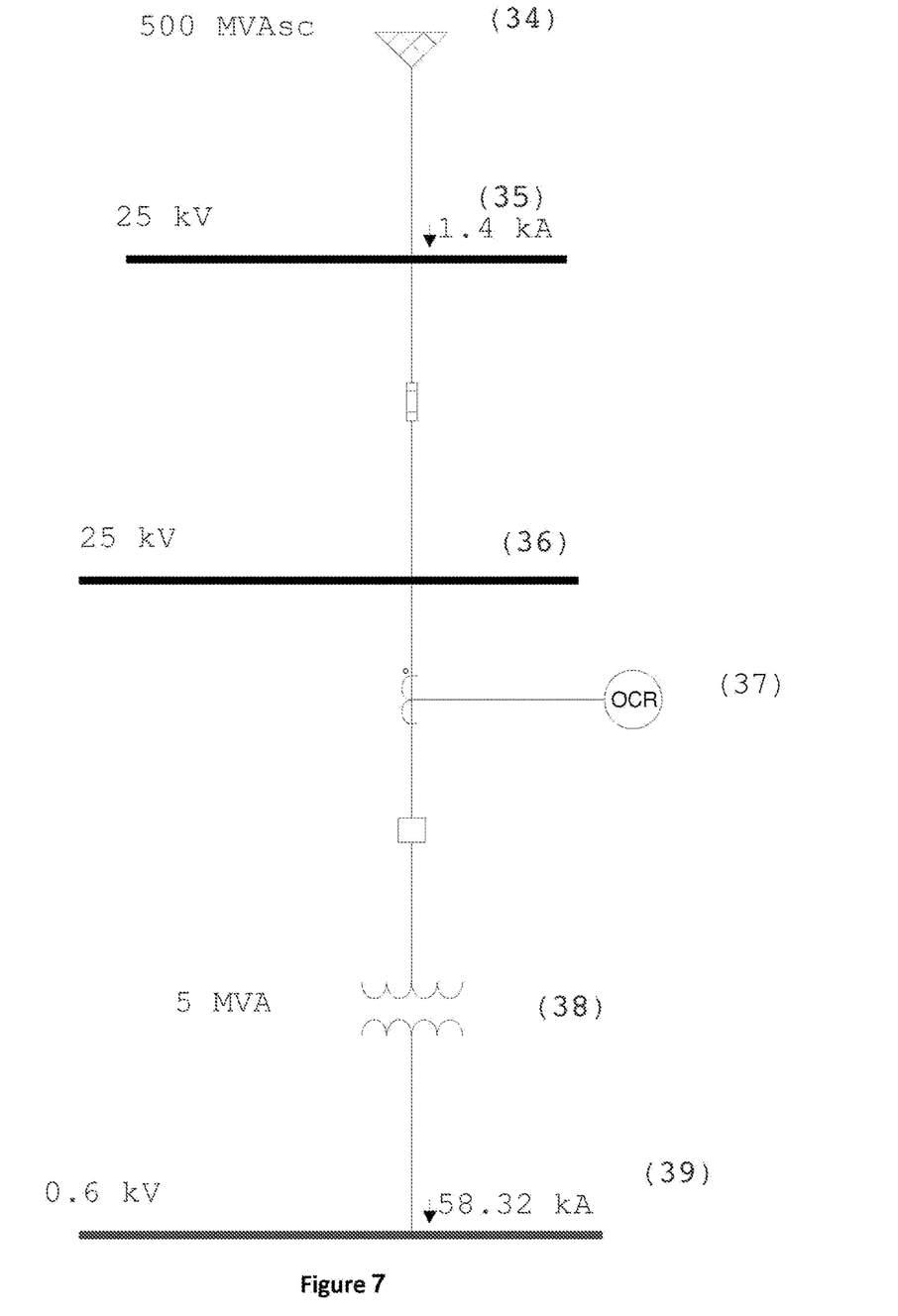
FIG. 7 shows the Incident Energy (IE) levels and fault clearing times for a 5 MVA transformer with no CSD (Prior Art).

FIG. 7 shows a single line diagram used for protection coordination simulations with typical protective relaying settings. With these settings and the layout shown on FIG. 7, the fault clearing time (FCT) would be up to 20 cycles (precisely FCT=20.339 cycles), which causes an incident energy (IE) level (potential severity of an arc flash event) of 52 cal/cm$^2$ (precisely IE=52.40 cal/cm$^2$ at 18"). The fault current (Ibf") at the location would be 58.32 kA. In this example, the same elements as used in figure FIG. 4 were utilized. The utility system (34), utility bus (35), customer bus (36), transformer (38), overcurrent protection relay (37) and customer load (39). This kind of energy can be lethal for people working in the vicinity. It should be noted that working on levels of 40 calories per square centimeter or greater should be avoided at all times due to the blast hazards caused by an arc flash event at this level. FIG. 5 illustrates the time vs. current coordination graph for the aforementioned scenario showing the transformer thermal limits (27) and the fuse characteristics (26).

Figure 9:
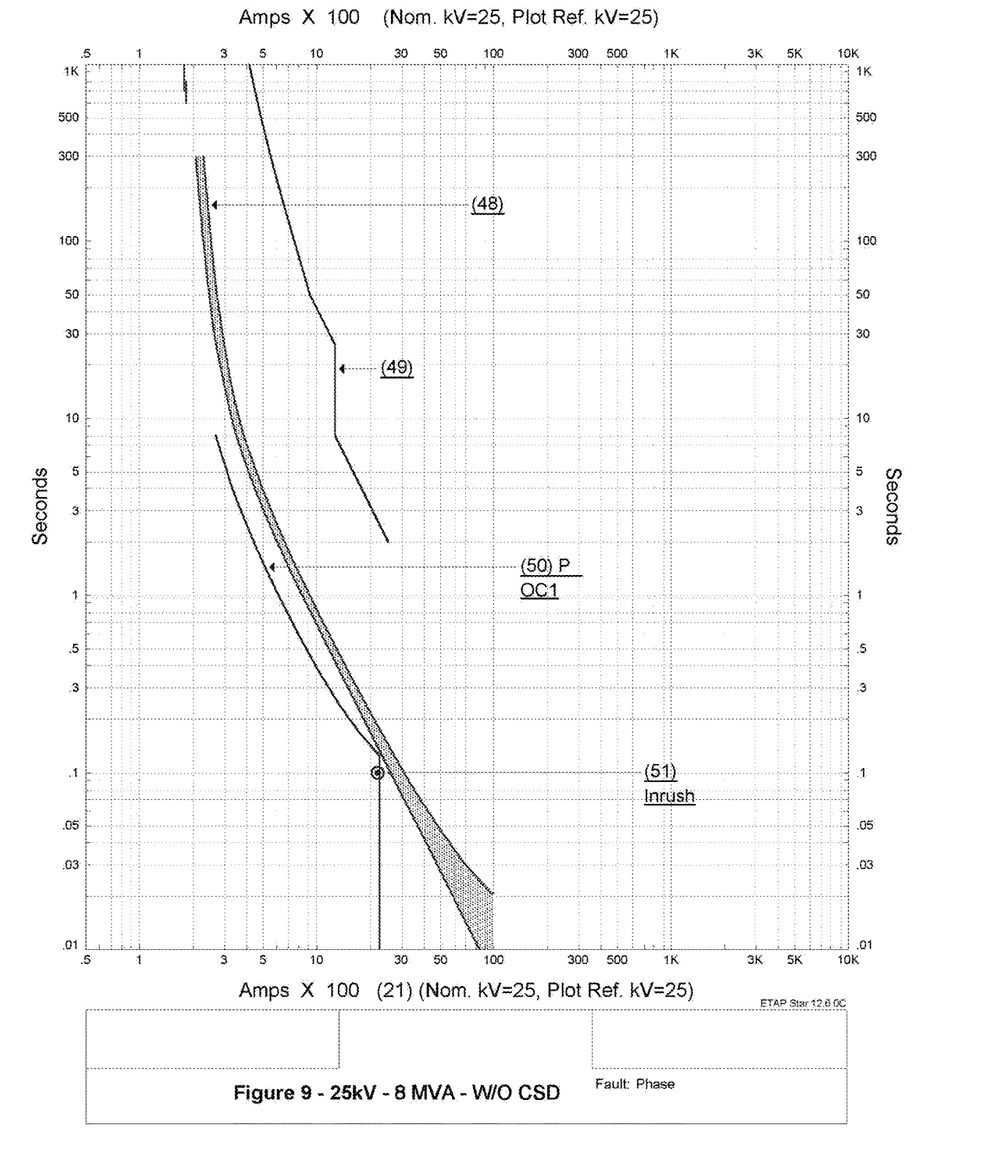
FIG. 9 shows the protective device coordination graph for an 8 MVA transformer with no CSD (Prior Art).

FIG. 9 shows the protection coordination curves of the FIG. 4 example but with a 8 MVA transformer (49) instead of 5 MVA. In this example, the overcurrent protection relay (50) still allows 180 A of continuous current, but now the instantaneous portion of the overcurrent protection relay (50) is set at 2280 A to overcome the larger inrush current (51) of the larger transformer. FIG. 9 shows that the overcurrent protection relay (50) setting does not provide sufficient clearance between itself and the utility fuse (48), and as such, this larger transformer connection would not typically be accepted on the utility.

There is thus a need for a new technique to reduce significantly the arc flash incident energy in commercial and industrial electrical installations that are connected to typical electric distribution networks by limiting transformer inrush current and allowing more sensitive protection settings.

There is also a need for a new technique to increase the energy capacity of electric installations.

SUMMARY OF THE INVENTION

This invention is related to a technique that lowers the arc flash occurrence in a commercial and industrial electrical installation by limiting its inrush current. In addition, this invention allows the increase of the installation's electrical capacity.

The present invention first concerns a method for lowering an arc flash inside the customer load being electrically fed with an electrical current controlled by an electrical circuit comprising a circuit breaker. The method comprising the step of providing the electrical circuit with a controlled switching device (CSD) adapted to send an open or close command to the breaker in order to synchronize an open or close mechanical operation to reduce an inrush current sent to the electrical circuit.

Preferably, the method disclosed herein further comprises the step of adjusting the CSD to close the breaker of the electrical circuit at an optimal electrical angle to reduce the inrush current. The breaker may be connected to an overcurrent protection relay. In that case, the method then further comprises the step of adjusting a sensitivity of the relay in order to obtain shorter fault clearing times and reduce the arc flash incident energy level to harmless levels.

The controlled switching device is connected to a transformer. The method then further comprises the step of calculating residual fluxes inside the transformer in order to calculate the optimal electrical angle on which to switch the breaker.

The method disclosed herein comprises the step of reducing or eliminating the inrush current during the energization of the transformer.

The electrical circuit may be fed with the electrical current via an electric distribution system comprising a fuse. The fuse may be connected to the breaker. The method then may further comprise the step of adapting a size of the fuse in function of the inrush current in order to sustain a higher inrush current. The method then may further comprise the step of replacing the transformer by another transformer having a larger electrical power, while conserving a same value of the fuse and maintaining an adequate selectivity and coordination between the overcurrent protection relay and the fuse.

The invention is also directed to a method for lowering an arc flash incident energy level inside an electrical circuit of a commercial or industrial electrical installation, the electric circuit comprising a breaker and being electrically fed with an electrical current, the method comprising the steps of:
 a. providing the electrical circuit with a controlled switching device (CSD) adapted to send an open or close command to the breaker in order to synchronize an open and close mechanical operations; and
 b. adjusting the CSD to close the breaker of the electrical circuit at an optimal electrical angle to reduce an inrush current sent to the electrical circuit.

The present invention may also concern an electric circuit comprising a breaker and being electrically fed with an electrical current. The electric circuit further comprises a controlled switching device (CSD) adapted to send an open or close command to the breaker in order to synchronize its open and close mechanical operation with the optimal electrical angle for lowering an arc flash event in the customer load.

The CSD may be adjusted to close the breaker of the electric circuit at an optimal electrical angle to reduce the inrush current.

In the electric circuit disclosed herein, the breaker may be downwardly connected to an overcurrent protection relay having a sensitivity adapted to obtain shorter fault clearing times reducing as such the arc flash incident energy level to harmless levels.

In the electric circuit disclosed herein, the electrical current may be provided to the circuit thanks to an electric distribution system comprising a fuse. The fuse may be connected to the breaker and has a size selected in function of the potential inrush current. The electric circuit disclosed herein comprises a transformer having a nominal power restricted by the utility, which imposes the maximum amperage value of the fuse. The overcurrent protection relay is set to maintain an adequate coordination and selectivity with the fuse.

The present invention is also directed to an electric circuit of a commercial or industrial electrical installation comprising a breaker and being electrically fed with an electrical current, wherein the electric circuit further comprises a controlled switching device (CSD) adapted to send an open or close command to the breaker in order to synchronize an open and close mechanical operation of the breaker, the CSD being adjusted to close the breaker of the electric circuit at an optimal electrical angle to reduce the inrush current for lowering an arc flash incident energy level inside the electrical circuit.

The present invention uses a controlled switching device (CSD) to control a power transformer energization by closing a circuit breaker of an electric circuit at an optimal electrical angle to reduce an inrush current provided to the electric circuit.

The present invention is also directed to the use of a controlled switching device to control a power transformer energization by closing a circuit breaker of an electric circuit of a commercial or industrial electrical installation at an optimal electrical angle to reduce an inrush current provided to the electric circuit and as such lowering an arc flash incident energy level inside the electrical circuit.

The invention is further directed to the use of a controlled switching device for increasing an energy capacity of an electric circuit of a commercial or industrial electrical installation comprising the controlled switching device (CDS), the CDS being adjusted to close a breaker of the electric circuit at an optimal electrical angle.

The invention is also directed to the use of a controlled switching device to control a power transformer energization by closing a circuit breaker of an electric circuit of a commercial or industrial electrical installation at an optimal electrical angle to reduce an inrush current provided to the electric circuit and as such increasing the energy capacity of the electrical installation.

The invention disclosed herein allows reducing significantly the arc flash incident energy level in commercial and industrial electrical installations connected to typical electric distribution networks. The invention disclosed herein allows limiting transformer inrush current and provides more sensitive protection settings.

The present invention also allows increasing the energy capacity of these installations. Inrush current reduction is achieved through the use of a Controlled Switching Device, alternatively known as a Point on Wave (POW) controller, more preferably an intelligent controller designed Controlled Switching Device.

At the present time, the protection setting cannot be sensitive enough due to this inrush current, which can rise up to 15 times the nominal current. Electrical energy is essentially the system Voltage×Time elapsed×Current. With this invention, protection can be set to lower levels thereby, increasing the protection sensitivity and decreasing the time to trip and isolate the fault, therefore minimizing energy from a fault and mitigating arc flash levels. In addition, this invention allows the increase of the installation's electrical capacity.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel controlled switching device and method using the same will be described hereinafter. Although the invention is described in terms of specific illustrative embodiment(s), it is to be understood that the embodiment(s) described herein are by way of example only and that the scope of the invention is not intended to be limited thereby.

The present invention provides a new technique and method used to lower the arc flash incident energy in commercial and industrial electrical installations equipped with power transformers and connected to typical electric distribution network.

By "commercial and industrial electric installations", it is meant any industrial or commercial load that may include any kind of electrical equipment such as motors, lighting systems, heating and cooling systems, automatic production lines, electrical furnace, etc.

By "tighter protection settings", it is meant to set the protection so as if a fault occurs, the protection will trip faster than it would normally trip taking into account the inrush current. As the inrush current is reduced, the protection limit for tripping will then be decreased.

Figure 3:
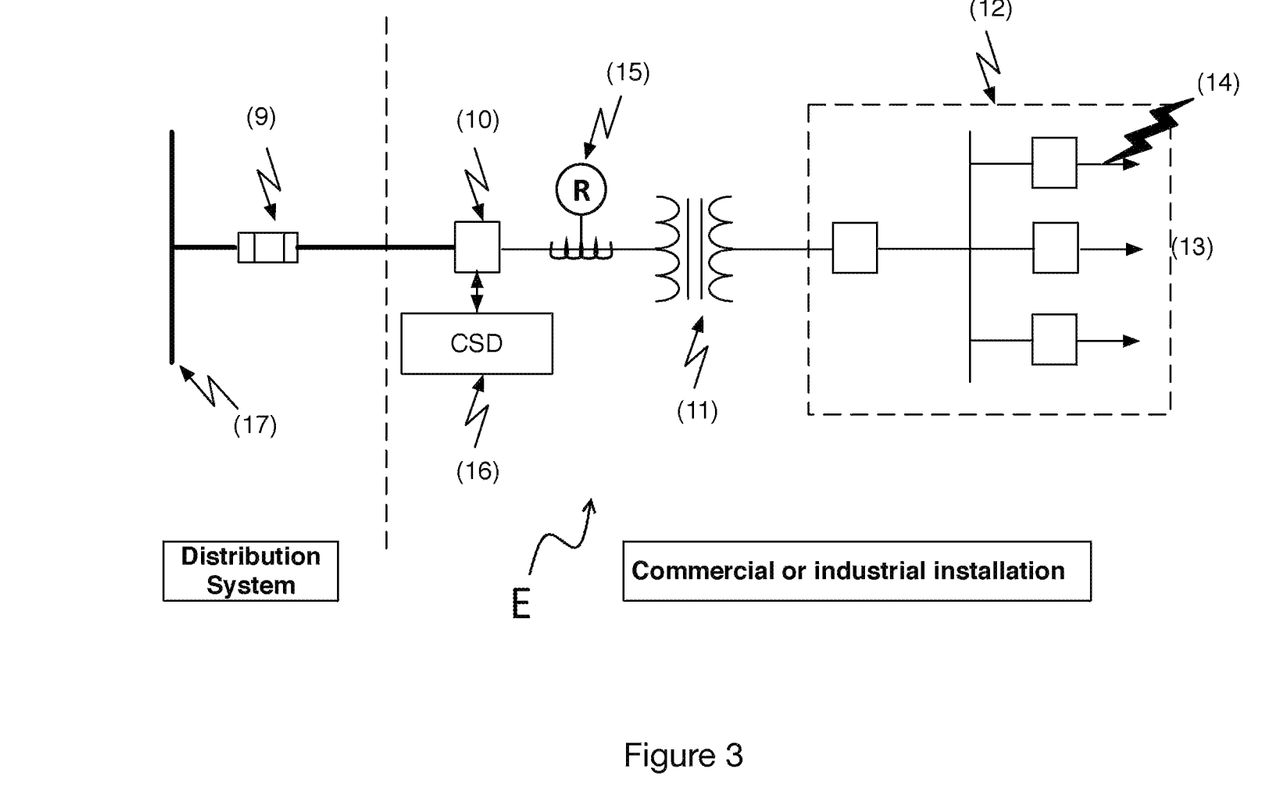
FIG. 3 shows the implementation of a Controlled Switching Device according to an embodiment of the present invention.

As shown in FIG. 3, the electric circuit according to the present invention comprises a CSD (16) to control the power transformer (11) energization by closing the circuit breaker (10) at the optimal electrical angle in order to reduce the inrush current and lowering arc flash (14) events in the electric installation (12) comprising loads (13). The use of a CSD (16) commanding the breaker (10) of the installation (12) also allows the increase of the energy capacity of commercial and industrial electrical installations (12) equipped with power transformers (11) and connected to a typical electric distribution system (17).

The CSD (16) is also known as Point on Wave (POW) controller. The CSD is an intelligent controller designed to send an open or a close command to a circuit breaker in order to synchronize its mechanical operation with the electrical signals on the network. The mechanical operation is preferably selected at an optimal electrical angle in order to decrease or eliminate switching transients.

In order to minimize the inrush current, the CSD (16) calculates the residual magnetic flux inside the transformer (11). Based on this information, the CSD (16) will choose the proper electrical angle for closing the circuit breaker (10).

Other electrical elements, such as breakers, transformers, overcurrent protection relays, fuses, loads, POW and CSD can be those disclosed in the art. In particular, U.S. Pat. No. 6,433,980 B1 describes the main functionality of a CSD that can be used herein. Also U.S. Pat. No. 7,576,957 B2 describes the main functionality of a POW that can be used herein. The content of U.S. Pat. No. 6,433,980 B1 and U.S. Pat. No. 7,576,957 B2 are enclosed herewith by reference.

The fuse (9) and overcurrent protection relay (15) protecting the distribution network interconnection (17) are typically rated and adjusted according to both the transformer inrush current and the maximum load capacity to be provided by the said transformer (11). As a consequence the reduction of the inrush current allows tighter setting of these protection devices in order to detect fault current faster and reduce downstream incident energy levels while increasing the energy capacity of the installation without adversely affecting the utility system.

Figure 6:
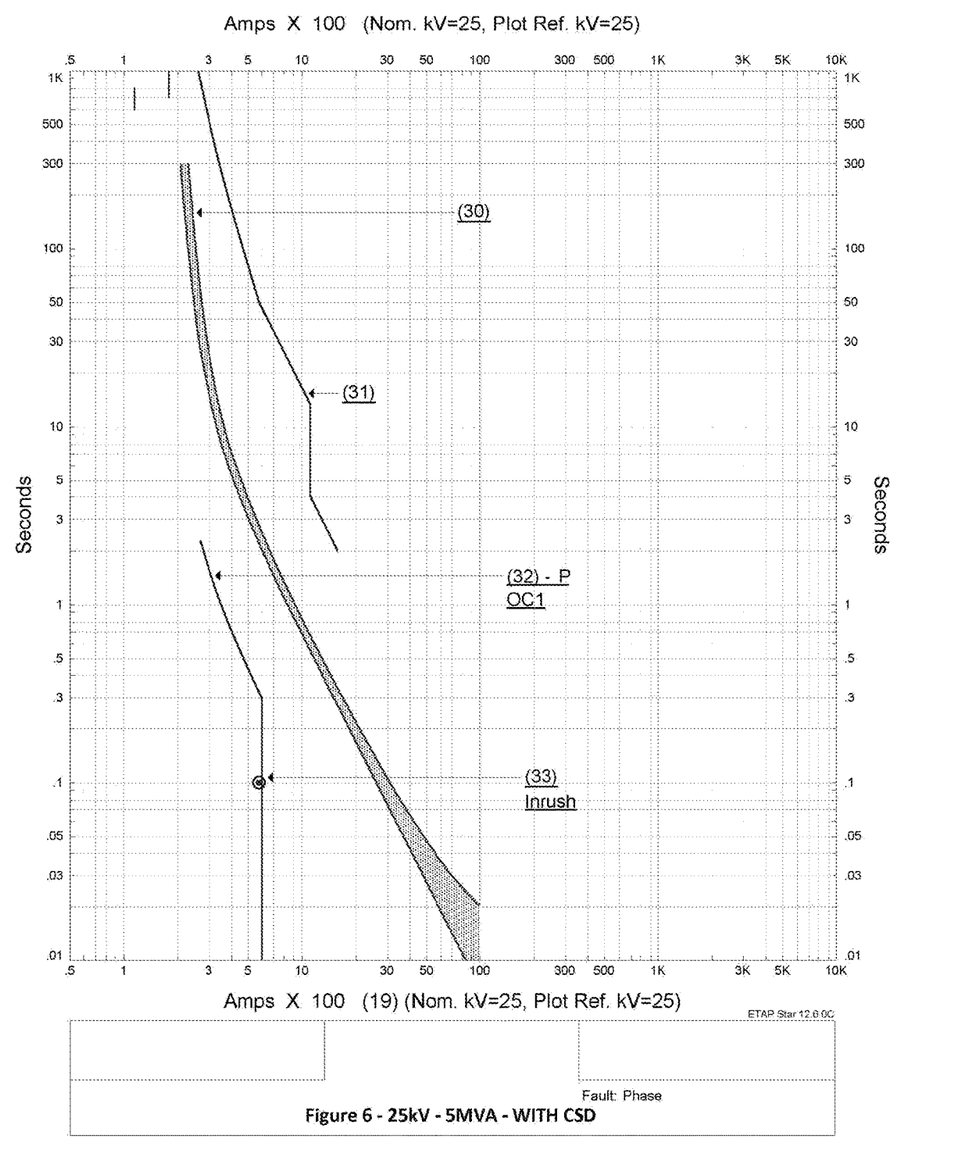
FIG. 6 shows the protective device coordination graph for a 5 MVA transformer with a CSD according to an embodiment of the present invention, and more sensitive protection settings.

FIG. 6 illustrates a study concerning the protection coordination using an electrical circuit in accordance with the principles of the present invention. In the present experiment, a CSD is used to minimize the inrush current of a transformer. Consequently, the protection relay may be parameterized (32) to increase the sensitivity or reactivity to mitigate incident energy levels. For example, an instantaneous pickup set at around 600 A is shown. Such amperage allow the elimination or clearing of the inrush current (33) using a CSD (16). By opposition, still in the same example as disclosed in FIG. 5, if no CSD is used, the required amperage to clear inrush (29) is greatly increased, being around 1400 A.

Figure 8:
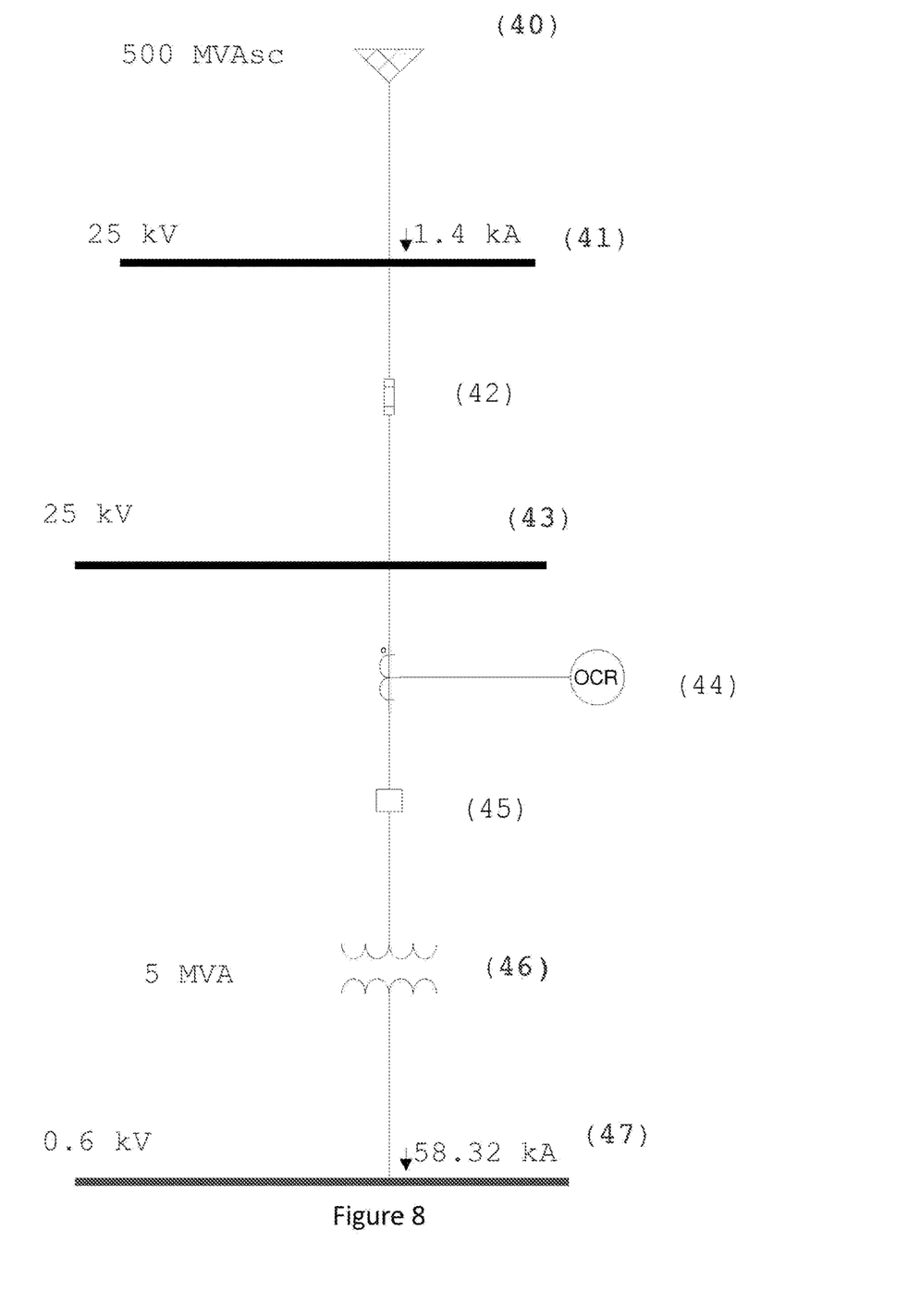
FIG. 8 shows the IE levels and fault clearing times for a 5 MVA transformer with a CSD according to an embodiment of the present invention, and more sensitive protection settings.

As shown in FIG. 8, a tighter protection settings (Level D; AFB=5.86 ft) typically results in lower fault clearing times (FCT=5.960 cycles) and the Incident Energy (IE) level falls to 18.3 cal/cm$^2$ (calories per square centimeter). In this last example, the same elements as FIG. 4 were used. The utility system (40), utility bus (41), the fuse (42), customer bus (43), circuit breaker (45), transformer (46) and customer load (47). However, the overcurrent protection relay (44) has a tighter setting. FIG. 6 also illustrates the same transformer thermal limits (31) and the fuse characteristics (30) as in FIG. 5.

Figure 10:
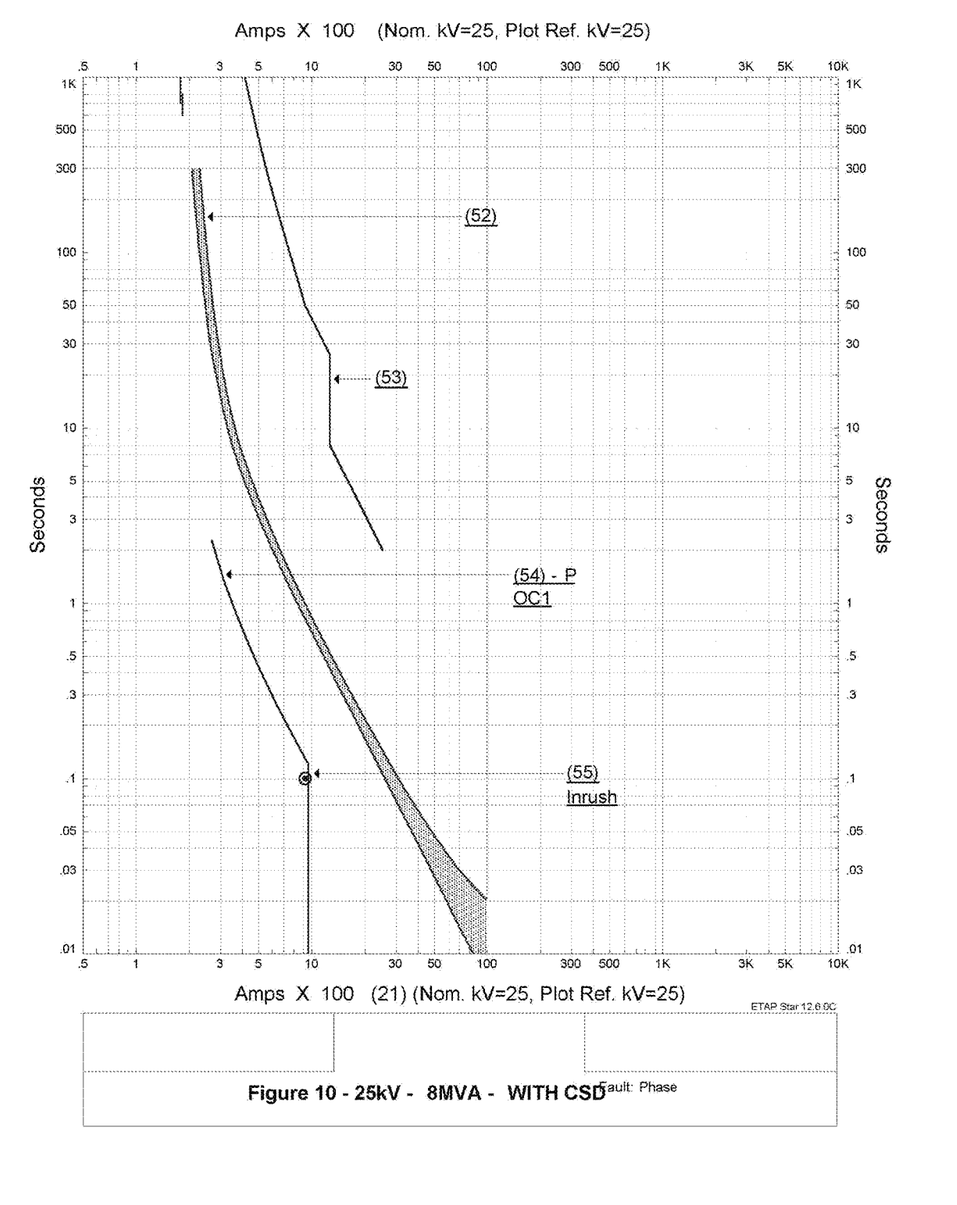
FIG. 10 shows the protective device coordination graph for an 8 MVA transformer with a CSD according to an embodiment of the present invention, and more sensitive protection settings.

FIG. 10 illustrates a protection coordination graph with the use of an 8 MVA power transformer. The study was done with a similar electrical installation as shown in FIG. 4 except that the transformer (24) has a capacity of 8 MVA and a CSD is adapted or configured to minimize the inrush current (55). The sensitivity or reactivity of the protection relay is increased and consequently a larger transformer may be used in a distribution system while still allowing coordination between the customer protection relay and the utility fuse.

As shown in FIG. 10, an 8 MVA transformer, as opposed to 5 MVA, can be installed with the same utility fuse (52) value while still maintaining adequate selectivity and coordination between the customer protection relay (54) and the utility protection device or fuse (52). FIG. 10 illustrates the new transformer thermal limits (53) for an 8 MVA unit.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

What we claim is:

1. A method for lowering an arc flash incident energy level to harmless levels inside an electrical circuit of a commercial or industrial electrical installation, the electric circuit comprising a circuit breaker connected to an overcurrent protection relay, and being electrically fed with an electrical current, the method comprising the steps of:
   providing the electrical circuit with a controlled switching device (CSD) adapted to send a close command to the breaker in order to synchronize the closing of the breaker at an optimal electrical angle to reduce the inrush current; and
   adjusting sensitivity of the overcurrent protection relay in order to obtain shorter fault clearing times;
   the CSD sending close command to the circuit breaker at an optimal electrical angle to reduce an inrush current sent to the electrical circuit.

2. The method according to claim 1, wherein the CSD is connected to a transformer, the method further comprising the step of calculating residual fluxes inside the transformer in order to determine the optimal angle of the breaker.

3. The method according to claim 2, further comprising the step of reducing or eliminating the inrush current during an energization of the transformer.

4. The method according to claim 1, wherein the electrical circuit is fed with the electrical current via an electric distribution system comprising a fuse, the fuse being connected to the breaker, the method further comprising the step of adapting size of the fuse in function of the potential inrush current.

5. The method according to claim 4, the electric circuit further comprising a transformer connected to the circuit breaker, the method further comprising the step of replacing the transformer by another transformer having a larger electrical power rating, while conserving a same value of the fuse and maintaining an adequate selectivity and coordination between the overcurrent protection relay and the fuse.

6. An electric circuit of a commercial or industrial electrical installation comprising a circuit breaker connected to an overcurrent protection relay, and being electrically fed with an electrical current, wherein the electric circuit further comprises a controlled switching device (CSD) adapted to send a close command to the circuit breaker in order to synchronize the closing of the breaker at an optimal electrical angle to reduce the inrush current, the overcurrent protection relay having sensitivity adapted to obtain shorter fault clearing times for lowering an arc flash incident energy level inside the electrical circuit to harmless levels.

7. The electric circuit according to claim 6, wherein the electrical current is provided to the circuit thanks to an electric distribution system comprising a fuse, the fuse being connected to the breaker and having a size selected in function of the potential inrush current.

8. The electric circuit according to claim 6, wherein the electrical circuit further comprises a transformer.

9. The electric circuit according to claim 8, wherein the transformer has an electrical power adapted to conserve a same value of the fuse and maintaining an adequate selectivity and coordination between the overcurrent protection relay and a fuse.

10. A method for lowering an arc flash incident energy level inside an electrical circuit of a commercial or industrial electrical installation, the electric circuit comprising a breaker and being electrically fed with an electrical current via an electric distribution system comprising a fuse, the fuse being connected to the breaker, the method comprising:

providing the electrical circuit with a controlled switching device (CSD) adapted to send a close command to the breaker in order to synchronize the closing of the breaker at an optimal electrical angle to reduce the inrush current; and adapting size of the fuse in function of potential inrush current;

the CSD sending close command to the breaker of the electrical circuit at an optimal electrical angle to reduce an inrush current sent to the electrical circuit.

11. The method according to claim 10, the electric circuit further comprising a transformer connected to the circuit breaker, the method further comprising replacing the transformer with another transformer having a larger electrical power rating, while conserving a same value of the fuse and maintaining an adequate selectivity and protection coordination.

12. An electric circuit of a commercial or industrial electrical installation being electrically fed with an electrical current via an electric distribution system comprising a fuse, the electric circuit comprising a circuit breaker and a controlled switching device (CSD) adapted to send close command to the circuit breaker in order to synchronize the closing of the circuit breaker, the CSD being adjusted to close the circuit breaker of the electric circuit at an optimal electrical angle to reduce the inrush current for lowering an arc flash incident energy level inside the electrical circuit, the size of the fuse being adapted as a function of potential inrush current.

13. The electric circuit according to claim 8, wherein the electric distribution system has an electrical power adapted to conserve a same value of the fuse and maintaining an adequate selectivity and protection coordination.

* * * * *